United States Patent [19]
Cheney

[11] 4,100,760
[45] Jul. 18, 1978

[54] FLUID SUSPENSION FREEZER AND METHOD

[76] Inventor: Paul L. Cheney, 4104-12th South, Seattle, Wash. 98108

[21] Appl. No.: 581,372

[22] Filed: May 27, 1975

Related U.S. Application Data

[63] Continuation-in-part of Ser. No. 384,034, Jul. 30, 1973, abandoned, which is a continuation-in-part of Ser. No. 204,940, Dec. 6, 1971, abandoned.

[51] Int. Cl.² ............................................. F25D 17/00
[52] U.S. Cl. ............................................. 62/57; 62/63; 34/10; 34/57 A
[58] Field of Search .................. 62/57, 63, 380; 34/10, 34/57 A; 264/14

[56] References Cited

U.S. PATENT DOCUMENTS

| | | | |
|---|---|---|---|
| 2,300,042 | 10/1942 | Caldwell | 62/57 X |
| 2,607,199 | 8/1952 | Christensen | 62/57 X |
| 2,699,045 | 1/1955 | Bailey | 62/57 X |
| 2,819,890 | 1/1958 | Rosa et al. | 62/57 X |
| 3,040,438 | 6/1962 | Perlman et al. | 65/57 X |
| 3,169,381 | 2/1965 | Persson | 62/57 |
| 3,313,032 | 4/1967 | Malecki | 62/57 X |
| 3,319,344 | 5/1967 | Sachsel et al. | 62/57 X |
| 3,394,463 | 7/1968 | Futer | 34/57 |
| 3,423,840 | 1/1969 | Beeken | 34/57 A |
| 3,495,654 | 2/1970 | Jacubowiez | 62/57 X |
| 3,580,552 | 5/1971 | Hassen | 34/57 |
| 3,670,520 | 6/1972 | Bontiel | 62/57 X |
| 3,738,121 | 6/1973 | Swindell | 62/378 |

FOREIGN PATENT DOCUMENTS 900,459   5/1972   Canada.

Primary Examiner—Ronald C. Capossela
Attorney, Agent, or Firm—Robert W. Beach; Ward Brown

[57] ABSTRACT

Loose particulate material to be frozen is supplied to a rising current of refrigerating fluid such as cold air. The velocity of the refrigerating fluid is such that the particulate material to be frozen is supported dynamically, or substantially suspended, by the refrigerating fluid so that the particulate material to be frozen settles slowly through the rising refrigerating fluid, or is slowly transported by such refrigerating fluid either upward or translationally. The refrigerating fluid may carry the material to be frozen through successive freezing chambers through which the refrigerating fluid rises. Such chambers may be vertical or may be inclined upwardly.

22 Claims, 16 Drawing Figures

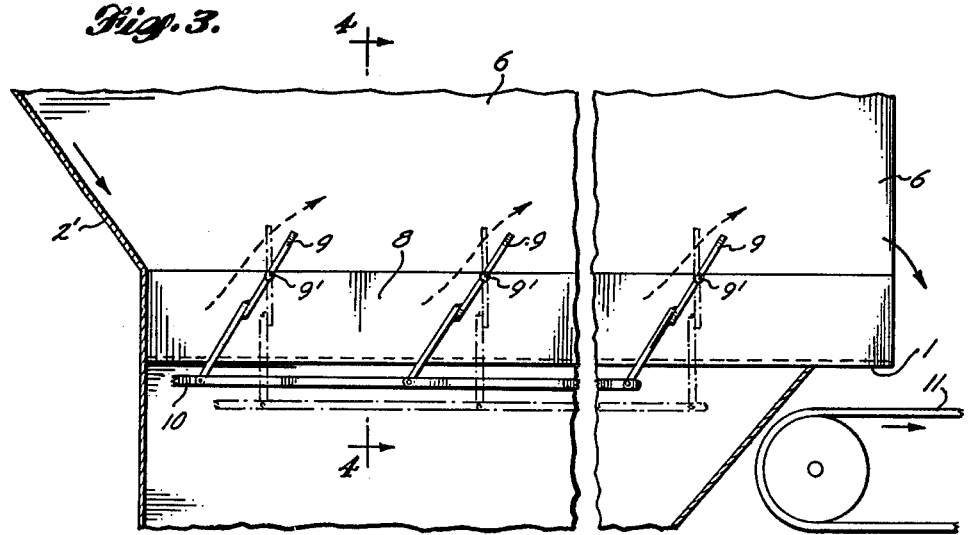
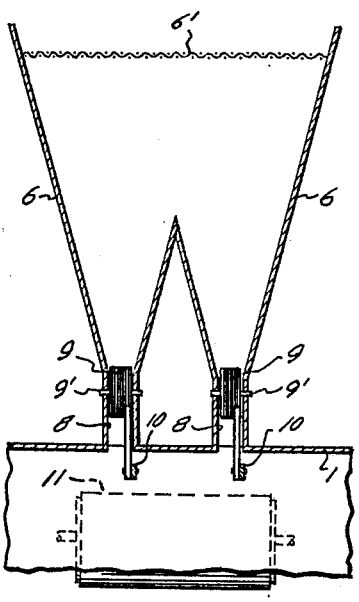 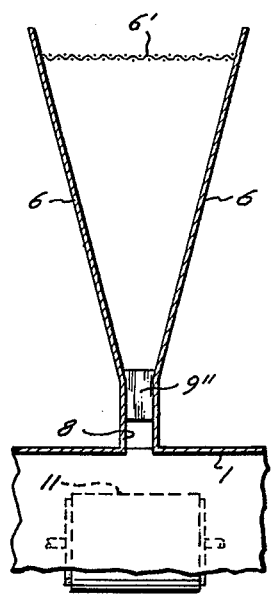

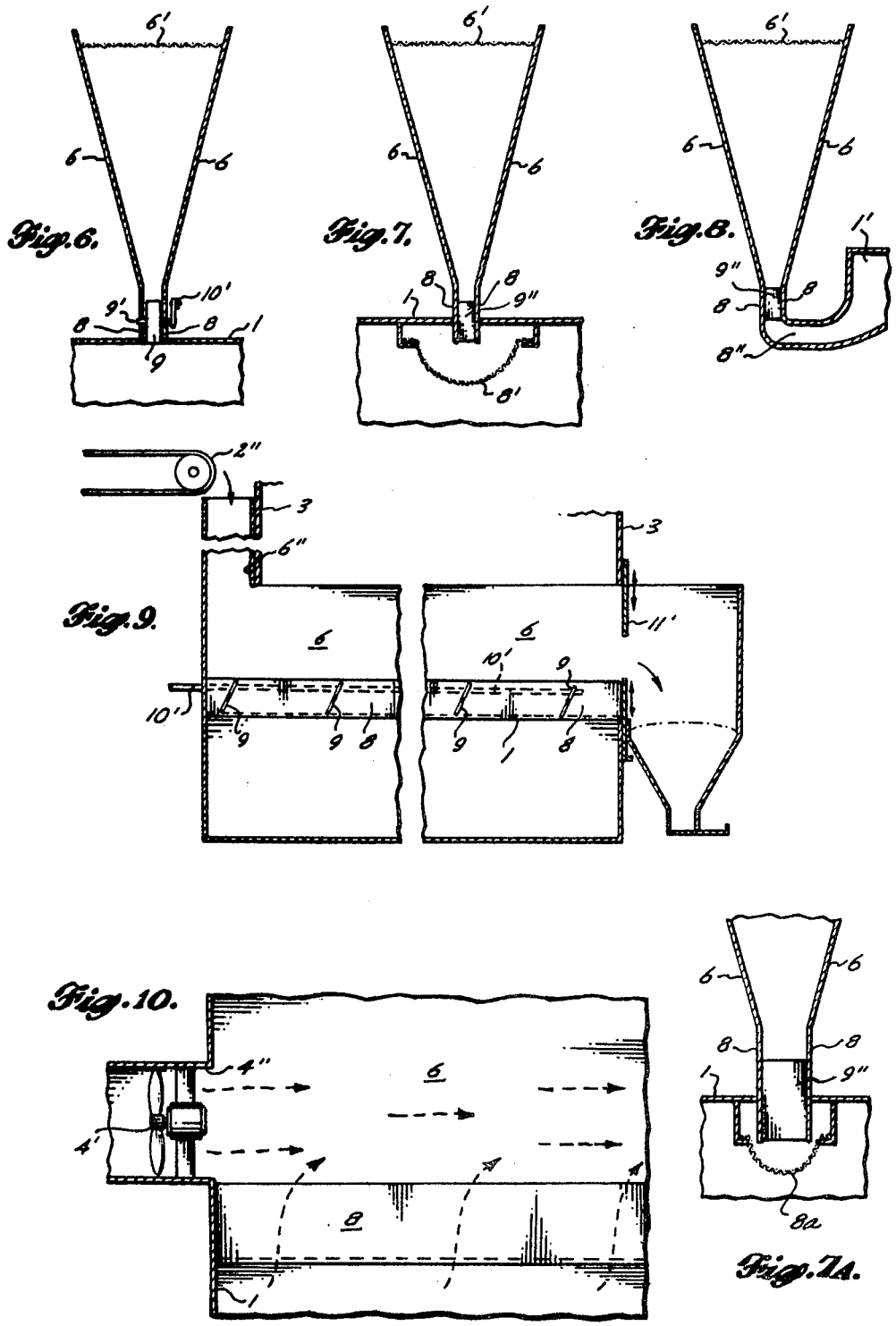

FLUID SUSPENSION FREEZER AND METHOD

This application relates to the subject matter of Disclosure Document No. 000987 filed Dec. 5, 1969, and is a continuation-in-part of application Ser. No. 384,034, filed July 30, 1973, now abandoned for Fluid Suspension Freezer and Method, which is a continuation-in-part of application Ser. No. 204,940, filed Dec. 6, 1971, for Fluid Suspension Freezer and Method, now abandoned.

BACKGROUND OF THE INVENTION

1. Field of the Invention

This invention relates to an apparatus and method for treating particulate material, and particularly for freezing particles such as food particles.

2. Prior Art

In the past, it has been customary to move particles to be frozen through a freezer either by a conveyor or in a fluidized bed without the particles actually being suspended in a substantially unbroken unitary smooth uniform air current.

SUMMARY OF THE INVENTION

A principal object of the present method and apparatus is to treat loose particulate material suspended in an upwardly moving substantially unbroken unitary smooth uniform gas current by contact with the gas in such current. More specifically, it is an object to quick-freeze this particulate material suspended in such an upwardly moving current of cold gas.

A further object is to prolong the period of contact with the freezing gas as long as necessary or desirable to freeze the material to be frozen while providing an efficient freezing operation.

Another object is to provide apparatus for performing such freezing method which is compact while being capable of handling a high volume of product to be frozen.

It is also an object to provide such apparatus and method which can be adapted to handle and freeze products of various densities and particle sizes.

In accomplishing freezing of particulate material by dynamic fluid suspension, it is an object to regulate the ascending speed of the freezing fluid automatically in accordance with preselected values so as to provide the desired degree of substaining or suspending effect on the product to be frozen, and also to control the direction of flow of the fluid to effect the speed and direction in which the product should be transported by the fluid.

An additional object is to provide an initial surface glaze on particles of matter to be frozen prior to freezing the interior of such particles completely, so as to deter adhesion of such particles to the walls of freezing chambers through which they pass.

It is a further object to provide positive control of the volume of product to be frozen by the apparatus and method of the present invention.

The foregoing objects can be accomplished by treating apparatus including a trough, means for supplying to the trough particulate material to be treated, and means for supplying gas to the trough moving upward through and longitudinally of the trough through the particulate material in the trough for exerting dynamic supporting force on the particles of such particulate material, which force is at least nearly equal to the weight of such particles, and for simultaneously moving the particles of the particulate material lengthwise of the trough. Also, the treating apparatus can include a treating chamber having an elongated conduit disposed with its length upright, means for supplying to the upper portion of the treating chamber particulate material to be treated for descent therethrough and deposit in a bed in the lower portion of the treating chamber, and means for supplying gas under pressure to the lower portion of the treating chamber at a location above and bypassing the particulate material deposited in the bed, for moving the gas upward through particulate material descending through the conduit and for exerting dynamic supporting force on the particles of such particulate material, which force is at least nearly equal to the weight of such particles but is insufficient to prevent gradual descent of the particles for deposit in the bed.

BRIEF DESCRIPTION OF THE DRAWINGS

FIG. 3 is a fragmentary side elevation of a portion of the apparatus shown in FIG. 2; and FIG. 4 is a vertical transverse section through such portion of the apparatus taken on line 4—4 of FIG. 3.

FIG. 5 is a vertical section through a portion of quick-freezing apparatus comparable to that shown in FIG. 4 but of modified construction.

FIGS. 6, 7, 7A, 8, 9, 10, 11, 12, 13 and 14 are somewhat diagrammatic vertical sections through components of different types of dynamic fluid suspension quick-freezing apparatus.

DETAILED DESCRIPTION

While the representative apparatus and method of the invention described below preferably utilizes cold air to effect freezing of the particulate product, such method and apparatus can use other types of treating gas to perform a treating process on particulate material. The process and apparatus of the present invention is particularly useful for freezing particles of vegetables such as peas, chopped beans, or diced carrots, for example. Also, it is possible for the process to be utilized to quick-freeze a mixture of different types of product simultaneously, provided that the freezing characteristics of such different product types are reasonably comparable and the specific gravity and particle size are nearly the same.

Figure 1:
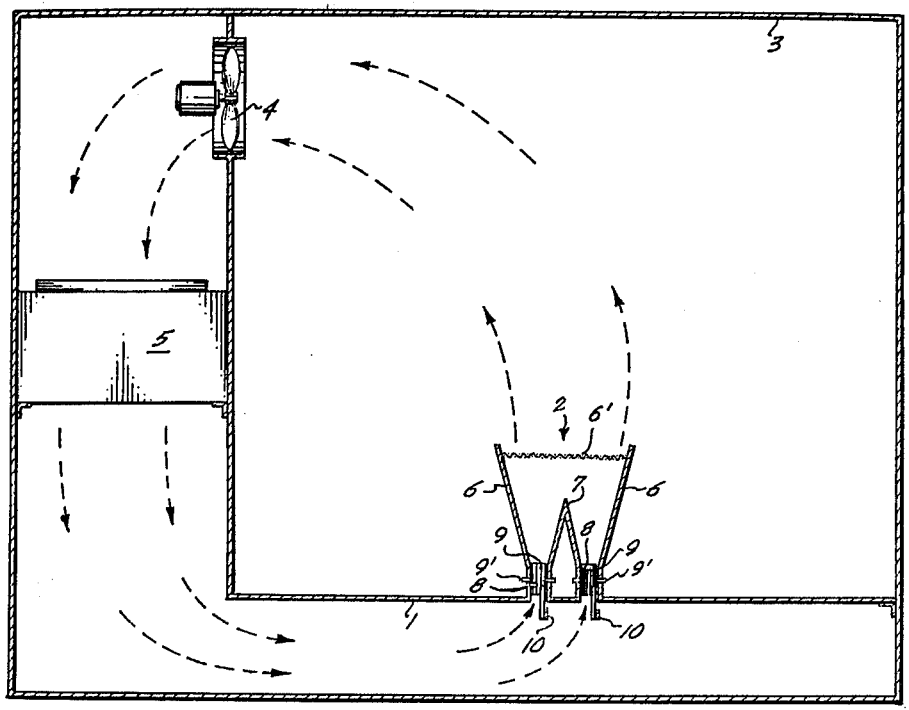
FIG. 1 is a somewhat diagrammatic vertical section through a representative type of dynamic fluid suspension quick-freezing apparatus.

In FIG. 1 cold air or other refrigerating gas is supplied from a plenum chamber 1 to the lower portion of a trough 2, which either may be horizontal or may be inclined upwardly or downwardly in the direction of the component of the fluid flow longitudinally of the trough to a greater or lesser extent. The particulate material to be frozen is fed to the supply end of the trough by a conveyor or chute 2'. The refrigerating gas will travel principally upwardly through the trough at a high velocity, such as 2,000 to 4,000 feet per minute, depending on the specific gravity and particle size of the product to be frozen, but will have a small component of movement lengthwise along the trough in the direction indicated by the arrow in FIG. 2. The upward velocity of such gas in the upper portion of the trough, which is less than the velocity in the lower portion of the trough because of the increase in cross section resulting from the upward flare of the trough, is sufficient to support dynamically the particulate product to be frozen. The gas is supplied to the freely open lower portion of the trough in a substantially unbroken unitary smooth flow uniformly distributed over the horizontal area of the trough lower portion instead of being supplied through holes or slots of a perforated plate and thereby being divided into jets producing a nonuniform, turbulent gas flow.

The speed at which the product will be transported along the trough by the freezing fluid will depend upon the velocity of such fluid and the component of such velocity lengthwise of the trough. Such velocity will be regulated so that the product to be frozen will be dynamically suspended in the trough by the upwardly flowing gas as it is transported along the trough for a period of time, such as 2 to 6 minutes, sufficient to complete freezing of the particulate material by the action on it of the refrigerating gas depending upon its temperature. The lower such temperature, of course, such as 20° to 50° F below zero, the less time will be required to complete the freezing of the particulate material.

If the refrigerating gas is to be recirculated, the product freezing zone defined by the trough 2 can be located in a freezing room or chamber 3. Refrigerating gas can be removed from such chamber by a circulating fan 4 which forces through a cooling heat exchanger 5 refrigerating gas withdrawn from the freezing chamber 3. The cooled gas is discharged from the heat exchanger 5 to the plenum chamber 1 to pass again up through the product freezing trough 2.

Figure 2:
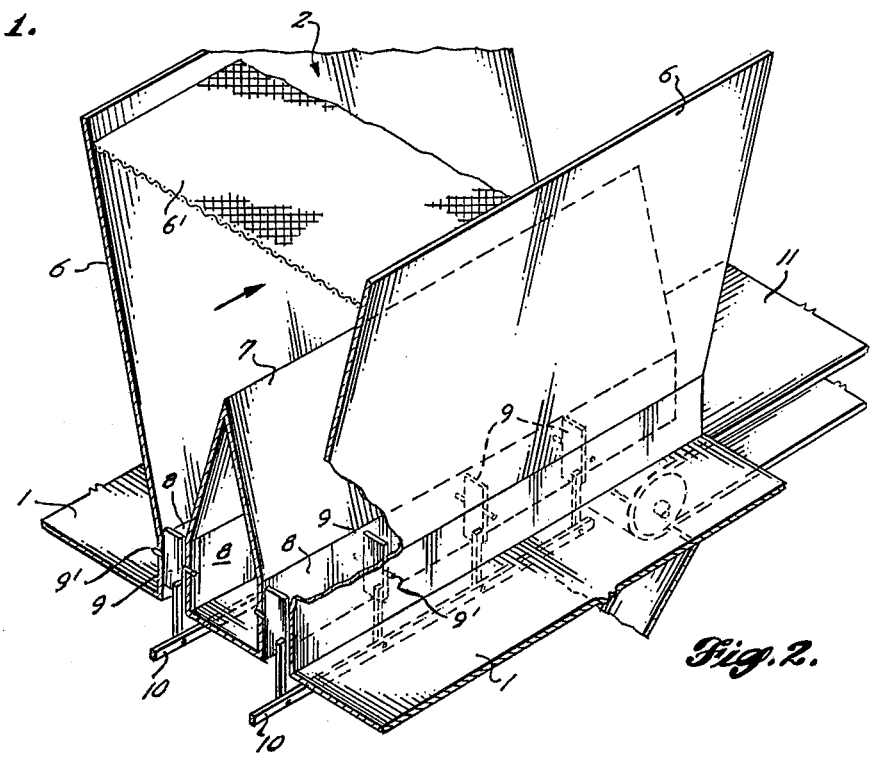
FIG. 2 is a fragmentary top perspective of a portion of the apparatus shown in FIG. 1.

Details of the product freezing trough are shown on an enlarged scale in FIGS. 2, 3 and 4. The opposite sides of the trough component are defined by the upwardly flaring walls 6 forming the upper portion of the trough. Preferably, the freezing trough includes a plurality of trough sections, adjacent sections of which are separated by an upwardly tapered divider 7 having a total height considerably less than the height of the trough sides 6, as shown best in FIG. 4. Refrigerating gas entrance slots are formed between the lower portions 8 of the trough walls which preferably are substantially parallel. The velocity of the gas will be constant through the lower portion of the trough between wall portions 8 and will decrease progressively upward in the flared portion of the trough. The surfaces of the trough walls and dividers are preferably coated with an antiadherent substance, such as Teflon, i.e. polytetrafluoroethylene, to prevent moist particles from freezing to such surfaces.

While only two trough sections are illustrated in FIGS. 1, 2 and 4, there can be any number of trough sections provided in a freezing chamber, the adjacent trough sections being separated by a divider 7 in each instance. Also, the dimensions of the trough sections can vary. In a representative installation the length of the trough may be from 40 to 60 feet, the height of the trough sides 6 may be 3 feet and the height of the divider 7 or dividers may be 1½ feet. Each of the sides 6 of the upper trough portion and each side of each divider 7 may be inclined approximately 15° relative to vertical.

The velocity of the unbroken unitary smooth flow of refrigerating gas passing upward into the trough 2 through the virtually unrestricted passages between the parallel wall portions 8 in the bottoms of the trough sections should be sufficiently great to suspend dynamically in each trough section product to be frozen to prevent such product from dropping down through such passages. Such passages may be about two inches wide, for example. The velocity of the refrigerating gas should not be sufficiently great, however, with respect to the height of the trough sides 6 and the specific gravity of the product being frozen, to carry the product above the height of the trough sides 6. To prevent the possibility of the product being carried above the sides of the trough, a screen 6' extends across the upper portion of the trough to provide a retaining barrier.

In order to maintain the product to be frozen in contact with the refrigerating gas for a sufficient period of time to accomplish such freezing, such as 2 to 6 minutes, the product should be fed into the trough 2 at one end by the conveyor 2' shown in FIG. 3 and the refrigerating gas should have a component of movement toward the opposite end of the trough which moves the dynamically suspended product slowly along the trough while preventing it from dropping from the troughs into the plenum chamber 1. If the trough is 60 feet long and the freezing time required is 6 minutes, the progress of the product along the trough would be 10 feet per minute. At the discharge end of the trough, the passage between walls 8 forming the lower portion of the trough is discontinued so that the inflow of refrigerating gas is interrupted and the dynamic support of the product is eliminated, causing the frozen product to fall onto a discharge conveyor 11 at or adjacent to the discharge end of the trough as shown at the right of FIGS. 2 and 3 for removal of the product from the freezing trough.

In order to provide the desired horizontal component of movement of the refrigerating gas supplied through the passages between wall portions 8, gas-direction-controlling vanes 9 can be mounted on pivots 9' at spaced intervals along the length of each trough section. All of the flow direction regulating vanes can be connected together by a bar 10 that can be reciprocated lengthwise to swing all of the vanes conjointly. By adjusting the angle of the vanes, the horizontal component of the upward movement of the refrigerating gas rising through a passage between wall portions 8 can be increased to accelerate the movement of the product lengthwise of trough 2 for reducing the freezing time. Conversely, bar 10 can be moved to tilt the vanes 9 into more nearly upright positon for reducing the horizontal component of movement of the refrigerating gas and increasing, correspondingly, the period of time in which the product will be subjected to the freezing action of the refrigerating gas.

It is not necessary for the trough 2 to include a plurality of sections as far as operation is concerned, although the capacity is increased by providing plural sections. In FIG. 5 a simplified construction is illustrated in which the trough 2 has only a single section between the side walls 6 and there is no intermediate divider. Also, the passage between the lower parallel wall portions 8 is provided with fixed guide vanes 9" rather than adjustable guide vanes for the purpose of producing the desired horizontal component for the refrigerating gas rising from the plenum chamber 1 through the slot 8 into the trough 2 defining the freezing zone.

In FIG. 6 also a single trough is shown having an upwardly flared upper portion between trough sides 6 to which the passage between parallel walls 8 forming the lower portion of the trough is connected. The direction of gas flow through such passage can be regulated by the vanes 9 mounted on pivots 9', as described above. In this instance, however, pivot arms of the several vanes are connected by a bar 10' located outside the plenum chamber 1 for convenience of construction and operation.

In FIGS. 7 and 7A, again a single trough is shown, but, in FIG. 7 a screen tray 8' and in FIG. 7A a screen tray 8a is shown as being mounted in slides beneath the passage formed between walls 8. Such screens are of very open mesh construction, however, so that they do not fragment the flow into a multiplicity of jets as would a perforated plate, but the flow remains substantially unbroken and unitary. If for any reason the flow of gas from the plenum chamber 1 to the entrance passage to the trough should be interrupted while particulate material is being dynamically supported by the gas, the particulate material would drop out of the trough. Instead of dropping into the plenum chamber 1, however, the material would be caught by the screen trough. Trough 8' in FIG. 7 can be slid endwise out of the plenum chamber on its supporting slides for removal of particulate material collected in it. From trough 8a in FIG. 7A material would be picked up when gas flow resumes, carried upward by the gas into the trough 6 and again suspended in the gas.

In FIG. 8 the single trough shown is similar to the trough described in connection with FIGS. 5, 6 and 7. In this instance, however, the plenum chamber 1' is located at one side of the trough formed by sides 6 and 8 instead of being directly beneath such trough. An accumulating chamber 8" is located below such trough, preferably having about the same width as the width of the passage between the parallel walls 8. If the flow of gas were interrupted while particulate material was being suspended by it, such particulate material would drop down through the gas entrance passage into the accumulating chamber 8". When gas flow is resumed the gas would pick up the particulate material accumulated in chamber 8" and carry it back up into trough 6. Because the plenum chamber 1' is located alongside the trough instead of beneath it, the apparatus can be made of reduced height.

In FIG. 9 a further modified form of the apparatus of FIG. 1 is shown in which particulate material is supplied by a belt conveyor 2" into an upright supply tube 6" of rectangular cross section communicating with the supply end of the trough or troughs 6. Because the flow of gas upward through such troughs is deflected to the right, as seen in FIG. 9, the velocity of gas flowing upward through the product supply tube 6" will be low so that the product will fall freely down into the trough or troughs 6.

The particulate material is suspended by the gas flowing upward through the trough, as previously described, and is moved to the right, as seen in that figure, to a discharge passage between upper and lower vertically movable doors 11'. Such doors can be adjusted independently to vary the vertical extent of the discharge passage and/or the location vertically of such passage. When the freezing of the product has been completed, it will move through such discharge passage into a collecting hopper. Material can be removed intermittently or continuously from such hopper. The product can be glazed during its descent through the supply tube 6", and its freezing can be completed during its travel to the right along the trough to the discharge opening.

Instead of all of the treating gas being supplied to the troughs through the passage between its lower parallel wall portions 8, the horizontal component of the gas can be supplied by an auxiliary fan 4' shown in FIG. 10 for each trough which blows gas through an opening 4" aligned with the length of the trough, or several horizontal currents of gas can be supplied at intervals along the trough. Such gas current or currents will provide a component of movement in the direction indicated by the arrows in FIG. 10 so that, as the gas supplied through the horizontal passage or passages blends with the gas flowing upwardly from the plenum chamber 1 through the passage between parallel walls 8, the resultant direction of movement of the gas will transport the suspended particles of particulate material longitudinally of the trough 6, as described above. The volume and velocity of gas supplied by the fan 4" will be regulated depending upon the volume of gas supplied to the trough from the plenum chamber 1 and the length of time desired for the particulate material to traverse the length of the trough 6.

Figure 11:
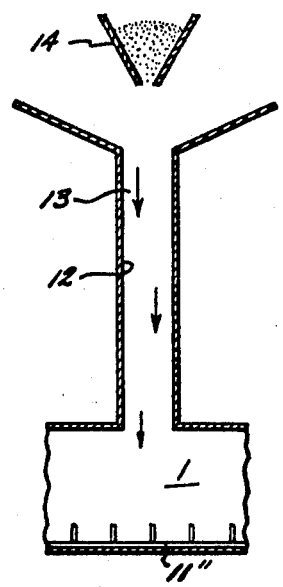

In FIG. 11 the freezing chamber is formed by an upright pipe 12 forming a substantially unobstructed passage 13 through which refrigerating fluid can rise from the plenum chamber 1, and through which products to be frozen can descend gradually, buoyed up by the rising refrigerating fluid. The particulate material to be frozen is supplied to the upper end of pipe 12 through a hopper 14 and, during freezing, the particulate material settles gradually to the bottom of the plenum chamber from which it can be removed by a suitable conveyor 11". Such conveyor may remove the particulate material, frozen loosely, from the plenum chamber by transporting or raking it into a bin or other container.

Figure 12:
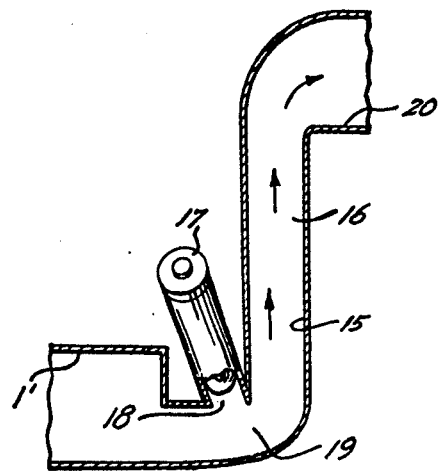

In FIG. 12 an upright conduit 15 again forms a substantially unobstructed upright freezing chamber 16, through which refrigerating gas rises from the plenum chamber 1', as described in connection with FIG. 8. In this instance, instead of particulate material to be frozen being supplied to the upper end of the freezing chamber as in FIG. 11, such material is supplied by a positive feed conveyor, such as a screw conveyor 17, to fall downward through a product-supply passage 18 into the gas entrance passage 19 at the lower end of the freezing chamber 16. Such particulate material is entrained by the current of refrigerating gas passing from the plenum chamber through the entrance passage 19 into the refrigerating chamber or passage 16.

In this instance the velocity of the refrigerating gas will be sufficient so that the particulate material is dynamically supported and carried slowly upward by the rising current of refrigerating gas through passage 16 and into an upper horizontal discharge passage 20. The velocity of the refrigerating gas in this instance will be greater than that utilized in the apparatus shown in FIG. 11, but will not be sufficiently great to transport the particulate material upward through the refrigerating passage 16 at a velocity approaching the velocity of the refrigerating gas. On the contrary, the velocity of the refrigerating gas will be considerably greater than that of the particulate material, so that the particulate material will take a sufficient length of time for passage upward through the refrigeration chamber 15 to enable the refrigerating gas to effect thorough freezing of the product.

Figure 13:
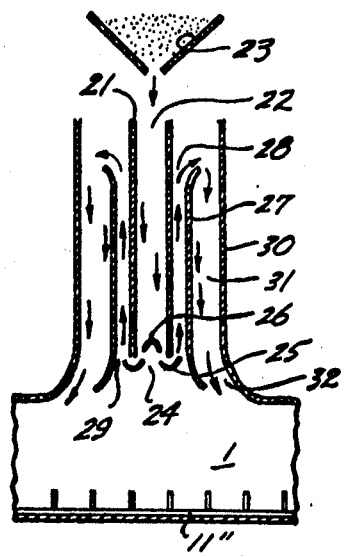

The apparatus of FIG. 13 shows a multiple-passage refrigerating chamber which is very compact. In this instance an upright conduit 21 forms a central refrigerating chamber 22 which is substantially unobstructed into the upper portion of which particulate material to be frozen is supplied from a hopper 23. A current of refrigerating gas enters the lower end of the upright freezing chamber 22 from the plenum chamber 1 through the central opening 24 in an annular trough 25 located below the bottom of the upright conduit 22. Spaced upwardly from the central portion of this trough is a cap 26 which will prevent products to be frozen from dropping through the refrigerating gas supply opening 24, but which will guide such product outwardly into the trough 25.

A conduit 27 is arranged concentrically around the conduit 21 to provide an annular passage 28 between the inner conduit wall 21 and the outer conduit wall 27. The opening 29 from the plenum chamber 1 into the lower end of the annular passage 28 past the periphery of the trough 25 is of venturi character, and the cross-sectional area of the annulus between the wall 21 and the wall 27 is less than the cross-sectional area of conduit 22 so that the velocity of the flow of refrigerating gas upward from plenum chamber 1 through the passage 28 will be greater than the velocity of flow of the refrigerating gas upward through passage 22.

Consequently, as the refrigerating gas passes upwardly through the annular venturi opening 29, it will produce an aspirating effect on particulate material to be frozen which has descended into the trough 25 so as to support such material dynamically and carry it upward through the annular refrigerating chamber 28 to its upper end, but at a velocity much lower than the velocity of the gas. The upper end of such chamber flares outwardly so as to increase its area both to reduce the velocity of the ascending refrigerating gas and to induce the particulate material being frozen to move radially outwardly.

Located concentrically around the intermediate wall 27 is a further annular wall 30 forming an additional annular leg 31 of the refrigerating chamber between the intermediate wall 27 and the outer wall 30. The cross-sectional area of this chamber is greater than the cross-sectional area of the chamber 28, and it is not formed of venturi cross section, so that the velocity of the refrigerating gas entering such chamber through the opening 32 from the plenum chamber 1 and rising through it will be less than the velocity of the gas flowing upward through the intermediate leg 28 of the refrigerating passage. The upward velocity of the refrigerating gas through the leg 31 should be sufficiently low as to enable particulate material to descend slowly through the passage 31 for eventual deposit in the lower portion of the plenum chamber 1 so that it can be removed by a conveyor 11".

By the use of this apparatus it will be seen that, while refrigerating gas rises from the plenum chamber 1 through all of the concentric passages 24, 28 and 31, the velocity of the refrigerating gas rising through the intermediate passage 28 will be greater than the velocity of the refrigerating gas rising through the central passage 22 and the outer annular passage 31. There should be sufficient difference in such velocities so that, while the product to be refrigerated cannot be completely supported dynamically and conveyed upwardly by the refrigerating gas flowing through the central passage 22 and the outer passage 31, the velocity of the refrigerating gas through the intermediate passage 28 will be sufficient to support such product dynamically and to carry the product to be refrigerated slowly upwardly.

As a result of such different velocities of freezing gas flow, the product to be refrigerated supplied to the multiple-pass apparatus of FIG. 13 from the hopper 23 will descend gradually through the passage 22, despite the refrigerating gas rising through it, until it lodges in the annular trough 25. The refrigerating gas rising through the opening 29 and the intermediate leg 28 of the refrigerating chamber will then pick up product to be frozen from the outer edge of the annular trough and carry it upward through such intermediate leg to its upper end. Because of the reduction in velocity of the freezing gas at this point, the product to be frozen will move outwardly into the outer annular passage 31 in which the refrigerating gas flowing upwardly through such passage 31 has a lower velocity. In that passage the product to be frozen will settle gradually until it passes through the opening 32 into the plenum chamber 1.

Figure 14:
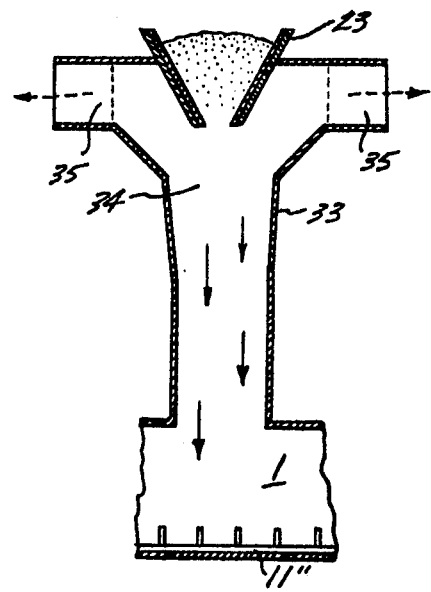

FIG. 14 shows in greater detail an arrangement for supplying particulate product to be frozen into an upright substantially unobstructed refrigeration chamber to which a rising current of refrigerating gas is supplied. An upright conduit 33, corresponding to the upright pipe 12 of FIG. 11, forms within it the refrigerating chamber 34, corresponding to the passage 13 of FIG. 11, to the lower end of which is supplied under pressure the refrigerating gas from the plenum chamber. This gas flows upward to the upper end of the refrigerating chamber where it is divided and discharged through opposite branch conduits 35. A hopper 23, located in the upper end of and concentric with the refrigerating chamber 34, supplies precooled, dewatered product to the upper end of the refrigerating chamber 34.

As described in connection with FIG. 11, the velocity of flow of the refrigerating gas upward through the refrigerating chamber 34 will be insufficient to support dynamically the particulate material to be frozen. Consequently, such product will float gradually downward through the rising refrigerating gas by which the product is buoyed up as it is being frozen until the product has settled through the lower end of the refrigerating chamber to the bottom of the plenum chamber 1 and is removed by suitable mechanism such as conveyor 11" discussed in connection with FIG. 11.

Figure 15:
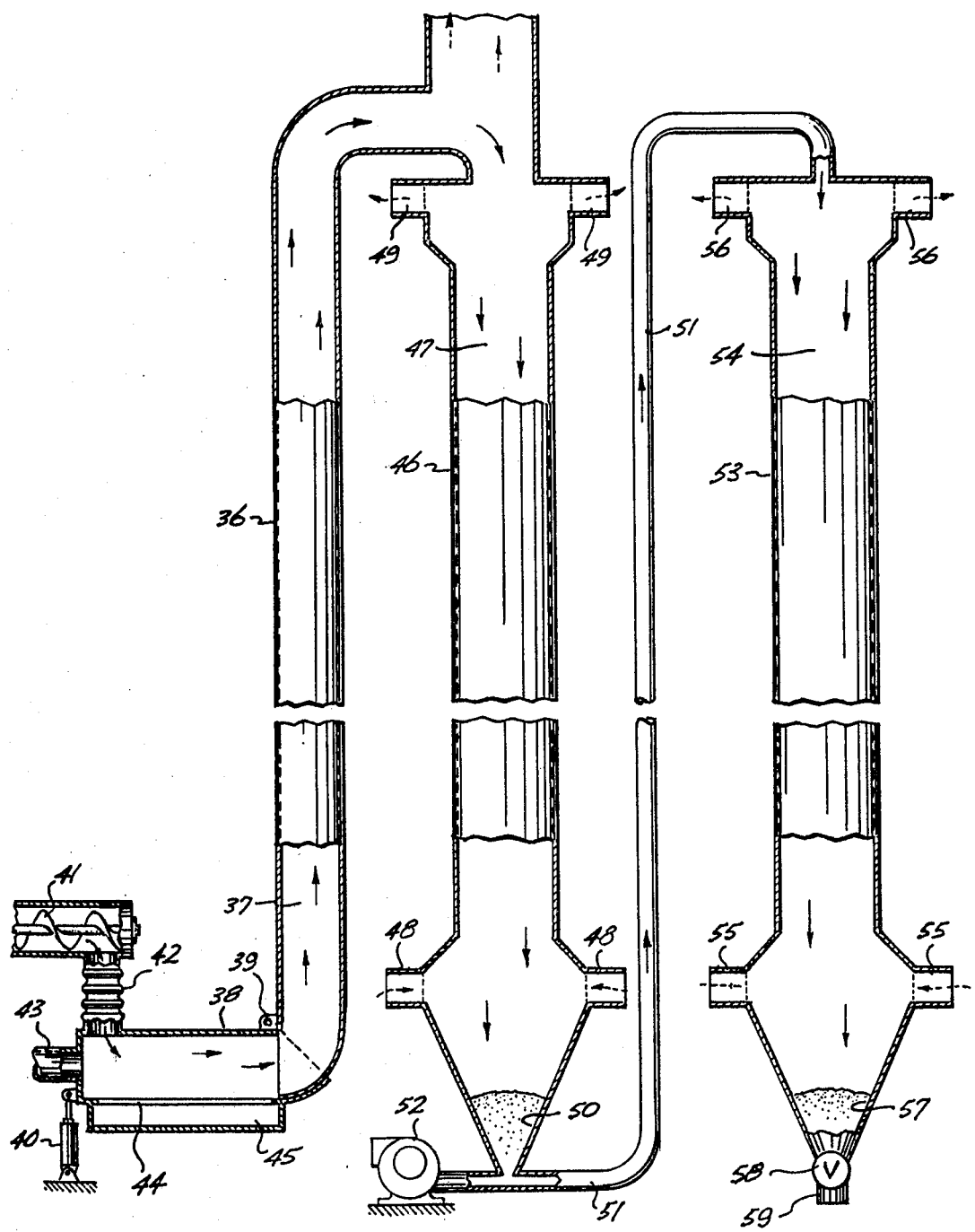
FIG. 15 is a somewhat diagrammatic elevation of representative multiple-pass dynamic fluid suspension quick-freezing apparatus having parts broken away.

In FIG. 15 more comprehensive freezing mechanism is illustrated providing multiple passes for particulate product to be frozen. In this instance a substantially unobstructed upright conduit 36 forms the primary leg 37 of a refrigerating chamber through which freezing gas and product rise. Such freezing gas and product are supplied to the lower end of the conduit 36 through a supply conduit portion 38, which may be horizontal or which may be inclined upwardly at any of various selected angles relative to the conduit 36. The supply conduit section 38 is connected to the lower end of the conduit section 36 by a pivot 39, and the angular relationship between the supply conduit section and the main conduit section can be altered by varying the effective length of a jack 40 connected to the end of conduit section 38 remote from pivot 39.

Product to be frozen is fed to the supply conduit section 38 by a positive displacement conveyor, such as a screw conveyor 41, through a flexible boot 42. A current of freezing gas is supplied through the conduit 43 lengthwise of the supply conduit 38 to facilitate transportation of the product through the supply conduit section. At the same time a sustaining current of refrigerating gas will be supplied through the slot 44 in the bottom of such conduit from a refrigerating gas plenum chamber 45. The horizontal width of conduit section 38 transversely of the direction of product flow may be about one half of its vertical width.

Refrigerating gas is supplied to the primary leg 37 of the refrigerating mechanism through the connection 43 and the slot 44 at a velocity sufficient to suspend or dynamically support the product to be frozen and carry it upward through such leg at a velocity less than the velocity of the rising refrigerating gas. At the upper end of the conduit 36 the refrigerating gas and product entrained in it are carried horizontally into a region of lower velocity above the upper end of an upright conduit 46 which forms the secondary leg 47 of the refrigerating chamber.

Refrigerating gas is supplied to the secondary leg 47 of the refrigerating chamber through a gas supply opening or openings 48 in the lower portion of substantially unobstructed conduit 46. From such supply openings the refrigerating gas flows upwardly through the secondary leg 47 and is discharged through a discharge opening or openings 49, although some of such gas may pass on upward and be discharged through the upper end of conduit 36. The velocity of flow of the freezing gas upward through the secondary leg 47 should be sufficiently slow so that the product being frozen will not be fully supported dynamically but will settle gradually downward through such secondary leg to be collected in a hopper 50 at the lower end of such conduit.

From the lower end of the hopper 50 partially frozen product is conveyed through a smaller conduit 51 by gas supplied by the blower 52 to convey such product to the upper end of a substantially unobstructed upright conduit 53 forming a tertiary leg 54 of the freezing chamber. Refrigerating gas is supplied to the lower end of such tertiary leg through a supply port or ports 55 to flow upward through such refrigerating chamber leg for discharge through the outlet port or ports 56 at the upper end of conduit 53.

Refrigerating gas is supplied to the tertiary leg 54 of the refrigerating chamber at a velocity such that the product being frozen again will not be fully supported dynamically but will float gradually downward through such tertiary leg to be collected in a hopper 57 forming the lower end of such conduit. The product which has then been frozen completely can be removed from the bottom of hopper 57 by a positive displacement conveyor, such as a screw conveyor, or suitable valving mechanism designated 58, for discharge through the outlet spout 59.

In performing the refrigerating method of the present invention by the use of apparatus such as described above, refrigerating gas, such as cold air, is supplied to the apparatus at such pressure and temperature as to effect movement of the product to be frozen at such velocity that the product will be subjected to the refrigerating gas for a period of time sufficient to freeze the product solidly. Consequently, the temperature of the refrigerating gas must be such as to accomplish such freezing within the period of time during which the product to be frozen is subjected to the influence of the gas. The refrigerating gas should be from −10° to −50° F., and a satisfactory representative temperature is −30° F.

Refrigerating gas, such as cold air, will be supplied to the refrigerating apparatus at a pressure which will provide the desired velocity of flow through the particular refrigerating apparatus. As the refrigerating gas under pressure is released into the refrigerating chamber, its pressure will be reduced and its temperature will be reduced correspondingly. Preferably the refrigerating apparatus will be located in a room at a low temperature to reduce heat loss.

The height of the apparatus or the length of each upright leg of the refrigerating chamber must also be taken into consideration in determining the desired velocity of the refrigerating gas. The longer each leg of the refrigerating chamber is and the greater the number of legs, the greater will be the total length of the path of travel of the product through the refrigerating apparatus and, consequently, for a given temperature of refrigerating gas, the higher the velocity of the product and refrigerating gas should be through the apparatus. Typically, each leg 37, 47 and 54 of the refrigerating apparatus illustrated in FIG. 7, defined by the conduits 36, 46 and 53, may be from 25 to 100 feet.

Also, the temperature of the refrigerating gas supplied to the opening or openings 48 of the secondary refrigerating chamber leg 47 may be lower than the temperature of the refrigerating gas supplied to the conduit section 38, and the temperature of the refrigerating gas supplied to the opening or openings 55 in the tertiary leg 54 of the refrigerating chamber may be lower than the temperature of the refrigerating gas supplied to the secondary leg 47. Suitable automatic controls may be provided for the apparatus to regulate the supply of refrigerating gas to the various components of the refrigerating chamber, depending upon the temperature of the refrigerating gas, the character of the product to be frozen, and the velocity of the refrigerating gas which will provide sufficient dynamic support for the product so as to assure adequate, but not excessive, exposure of the product to be frozen to the refrigerating gas.

An advantage of the refrigerating process described above, utilizing the refrigerating apparatus shown and described, is that the refrigerating gas, if recirculated, may be cooled in any suitable heat exchanger by use of a suitable refrigerant without the product to be frozen coming into contact with the primary refrigerant. Moreover, since the particulate product is suspended in the refrigerating gas by the gas dynamically supporting the product during the freezing process, each particle of the product will be frozen separately so that the frozen material will be loose instead of the particles being frozen together in clumps. The resulting quick-frozen product can then be held in frozen condition at temperatures much higher than the temperature of the freezing gas used to freeze the product initially. Thus the holding temperature may be in the neighborhood of 0° to 10° F.

I claim:

1. Treating apparatus comprising a trough, at least a portion of said trough flaring upwardly and the walls of a portion of the trough below said upwardly flaring portion are steeper than the walls of said upwardly flaring portion, means for supplying to said trough particulate material to be treated, and means for supplying gas to said trough moving upward through and longitudinally of said trough through the particulate material in said trough for exerting dynamic supporting force on the particles of such particulate material, which force is at least nearly equal to the weight of such particles, and for simultaneously moving the particles of the particulate material lengthwise of said trough.

2. The apparatus defined in claim 1, in which the walls of a portion of the trough below the upwardly flaring portion are in substantially parallel upright planes.

3. The apparatus defined in claim 1, and means covering an upper portion of the trough through which gas can pass but which means prevent passage of particulate material therethrough.

4. Treating apparatus comprising a trough, supply means for supplying to said trough particulate material to be treated, means for supplying to the lower portion of said trough a substantially unbroken unitary smooth flow of treating gas uniformly distributed over the horizontal area of said trough lower portion and moving upward through such particulate material in said trough for exerting dynamic supporting force on the particles of such particulate material, which force is at least nearly equal to the weight of such particles, and gas-direction control means imparting a horizontal component of movement along said trough to the gas moving upward through the particulate material in said trough.

5. The apparatus defined in claim 4, in which the gas-direction control means is movable to vary the amount of horizontal component imparted to the upwardly moving gas.

6. The method of freezing particulate material which comprises moving a substantially unbroken unitary smooth flow of cold refrigerating gas uniformly distributed over the horizontal area of a trough lower portion in a current, delivering particulate material to be frozen to such current of refrigerating gas, and dynamically suspending and conveying the particulate material to be frozen generally horizontally along the trough at a speed much less than the speed of movement of the refrigerating gas by moving the refrigerating gas upward through the particulate material in a direction inclined relative to vertical, the refrigerating gas thereby exerting a horizontal component of force on the particulate material for effecting such conveying of the particulate material.

7. The method defined in claim 6, including moving the refrigerating gas inclined relative to vertical in a direction such that the vertical component of movement of the gas for dynamically suspending the particulate material is much greater than the horizontal component of movement of the gas for conveying the particulate material along the trough.

8. The method of treating particulate material which comprises moving a substantially unbroken unitary smooth flow of treating gas uniformly distributed over the horizontal area of a trough lower portion in a current, delivering particulate material to be treated to such current of treating gas, and dynamically suspending and conveying the particulate material to be treated generally horizontally along the trough at a speed much less than the speed of movement of the treating gas by moving the treating gas upward through the particulate material in a direction inclined relative to vertical, the treating gas thereby exerting a horizontal component of force on the particulate material for effecting such conveying of the particulate material.

9. Treating apparatus comprising a trough having a freely open lower portion, means for supplying to said trough particulate product to be treated, means for supplying to the freely open lower portion of said trough a substantially unbroken unitary smooth flow of treating gas uniformly distributed over the horizontal area of said trough lower portion and moving upward through and longitudinally of said trough through the particulate product in said trough for exerting dynamic supporting force on the particles of such particulate product, which force is at least nearly equal to the weight of such particles, for suspending the particulate product and for simultaneously moving the particles of the particulate product lengthwise of said trough, a chamber beneath said trough, and a passage between said trough and said chamber sufficiently unobstructed as to enable passage of particulate product therethrough from said trough to said chamber but for said product-suspending gas flow.

10. Treating apparatus comprising a trough having a freely open lower portion, supply means for supplying to said trough particulate material to be treated, and means for supplying to the freely open lower portion of said trough a substantially unbroken unitary smooth flow of treating gas uniformly distributed over the horizontal area of said trough lower portion and moving upward through and longitudinally of said trough through the particulate material in said trough for exerting dynamic supporting force on the particles of such particulate material, which force is at least nearly equal to the weight of such particles, and for simultaneously moving the particles of the particulate material lengthwise of said trough.

11. Treating apparatus comprising a treating chamber including an elongated substantially unobstructed conduit disposed with its length upright and having a bed in the lower portion of said treating chamber beneath said conduit, means for supplying to the upper portion of said treating chamber particulate material to be treated for descent therethrough and deposit in said bed, and means for supplying gas under pressure to the lower portion of said treating chamber at a location above and bypassing the particulate material deposited in said bed for moving upward in a substantially unbroken unitary smooth flow at a velocity for exerting dynamic supporting force on the particles of such particulate material through at least the major portion of the length of said conduit, which force is at least nearly equal to the weight of such particles but is insufficient to prevent gradual descent of such particles through said conduit for deposit in said bed.

12. The apparatus defined in claim 11, the treating chamber including a plurality of upright conduits connected in series.

13. The apparatus defined in claim 12, in which the upright conduits connected in series are disposed in concentric relationship.

14. Treating apparatus comprising an elongated substantially unobstructed hollow member disposed along a generally vertical axis, said member being open at each end, a collection receptacle connected to the lower end of said member, means for introducing solid food articles to be treated into the upper end of said member so that the articles fall by gravity substantially axially thereof, and means for introducing gas under pressure into said member adjacent to said lower end, said gas being forced upwardly in a substantially unbroken unitary smooth flow through at least the major portion of the length of said member in counter-flow relationship with said articles, whereby the articles falling through said member are treated by said gas.

15. Temperature-modifying apparatus comprising an elongated substantially unobstructed hollow member disposed along a generally vertical axis, said hollow member being open at each end, a collection receptacle connected to the lower end of said hollow member, means for introducing solid food articles to be treated into the upper end of said hollow member so that the articles fall by gravity substantially axially thereof, and means for introducing refrigerant under pressure into said hollow member adjacent to its lower end, said refrigerant being forced upwardly in a substantially unbroken unitary smooth flow through at least the major portion of the length of said hollow member as a gas in counter-flow heat-exchange relationship with the food articles, whereby the temperature of the food articles falling through said hollow member is modified by said refrigerant.

16. The method of freezing particulate material which comprises delivering particulate material to be frozen to the upper portion of a vertically elongated substantially unobstructed freezing chamber and depositing such particulate material in a bed at a location below the location at which it was delivered to the freezing chamber, introducing cold refrigerating gas to the freezing chamber at a location above the deposited particulate material, and moving such cold refrigerating gas upward in a substantially unbroken unitary smooth flow through the freezing chamber at a velocity sufficient for such gas to exert a buoying force on particles of the particulate material through at least the major portion of the freezing chamber above the deposited particulate material and the location of refrigeration gas introduction to the freezing chamber and thereby dynamically supporting such particles sufficiently to deter descent of the particles to the bed for a period such that the refrigerating gas effects freezing of the particles while they are thus dynamically supported by the refrigerating gas during their descent through the freezing chamber prior to being deposited on the bed.

17. Temperature-modifying apparatus comprising an elongated substantially unobstructed hollow member disposed along a generally vertical axis, means for introducing solid food articles to be treated into said hollow member, and means for introducing refrigerant under pressure into said hollow member at a substantial distance below its upper end, said refrigerant being forced upwardly in a substantially unbroken unitary smooth flow through said hollow member as a gas in heat-exchange relationship with the food articles, whereby the temperature of the food articles in said hollow member is modified by said refrigerant.

18. The temperature-modifying apparatus defined in claim 17, in which the means introduce refrigerant into the hollow member under a pressure sufficient to enable the refrigerant to carry the solid food articles upward through at least a portion of the length of the hollow member.

19. The method of freezing particulate material which comprises delivering particulate material to be frozen to a vertically elongated substantially unobstructed freezing chamber, introducing cold refrigerating gas to the freezing chamber at a location below the location at which the particulate material is delivered to the freezing chamber, and moving such cold refrigerating gas upward in a substantially unbroken unitary smooth flow through the freezing chamber at a velocity sufficient for such gas to exert a buoying force on particles of the particulate material in the freezing chamber above the location of refrigerating gas introduction to the freezing chamber and thereby dynamically supporting such particles at least sufficiently to substantially deter descent of the particles so that the refrigerating gas effects freezing of the particles while they are thus dynamically supported by the refrigerating gas moving upward through the freezing chamber.

20. The method defined in claim 19, in which the cold refrigerating gas is moved upward through the freezing chamber at a velocity sufficient to exert a buoyant force on particles of the particulate material as to effect movement of such particles upward through the freezing chamber at a velocity much less than the velocity of the refrigerating gas.

21. Temperature-modifying apparatus comprising an elongated substantially unobstructed hollow member having its length upright, a transfer chamber connected to the lower end of said hollow member, means for introducing solid food articles to be treated into said hollow member, means for introducing refrigerant under pressure into said transfer chamber for movement upwardly in a substantially unbroken unitary smooth flow through said hollow member as a gas in heat exchange relationship with the food articles at a velocity for exerting dynamic supporting force on the articles nearly equal to the weight of such articles but insufficient to prevent gradual descent of such articles through said hollow member into said transfer chamber, and removing means for removing continuously from said transfer chamber food articles which have descended into said transfer chamber from said hollow member.

22. Temperature-modifying apparatus comprising an elongated substantially unobstructed hollow member having its length upright, means for introducing solid food articles to be treated into said hollow member, and means for introducing refrigerant under pressure into said hollow member at a location below the location at which the solid food articles are introduced into said hollow member, the refrigerant being forced upwardly in a substantially unbroken unitary smooth flow through said hollow member as a gas in heat exchange relationship with the food articles at a velocity sufficiently great to move the food articles upward in said hollow member at a velocity less than the velocity of the refrigerant, whereby the temperature of the food articles in said hollow member is modified by the refrigerant during upward movement of the food articles in said hollow member.

* * * * *